US011228407B2

(12) United States Patent
Jeon et al.

(10) Patent No.: US 11,228,407 B2
(45) Date of Patent: Jan. 18, 2022

(54) APPARATUS AND METHOD FOR TRANSMITTING CONTROL INFORMATION FOR COORDINATED TRANSMISSION IN WIRELESS COMMUNICATION SYSTEM

(71) Applicant: Samsung Electronics Co., Ltd., Gyeonggi-do (KR)

(72) Inventors: Joseph Jeon, Gyeonggi-do (KR); Dongwook Choi, Seoul (KR)

(73) Assignee: Samsung Electronics Co., Ltd ( * ) Notice: Subject to any disclaimer, the term of this patent is extended or adjusted under 35 U.S.C. 154(b) by 139 days.

(21) Appl. No.: 15/544,805

(22) PCT Filed: Jan. 13, 2016

(86) PCT No.: PCT/KR2016/000340
§ 371 (c)(1),
(2) Date: Jul. 19, 2017

(87) PCT Pub. No.: WO2016/117875
PCT Pub. Date: Jul. 28, 2016

(65) Prior Publication Data
US 2018/0006780 A1 Jan. 4, 2018

(30) Foreign Application Priority Data
Jan. 19, 2015 (KR) .................. 10-2015-0008948

(51) Int. Cl.
H04L 5/00 (2006.01)
H04W 88/08 (2009.01)
(Continued)

(52) U.S. Cl.
CPC .......... H04L 5/0035 (2013.01); H04W 28/02 (2013.01); H04W 72/1205 (2013.01); H04W 72/1289 (2013.01); H04W 88/08 (2013.01)

(58) Field of Classification Search
None
See application file for complete search history.

(56) References Cited

U.S. PATENT DOCUMENTS

2013/0195053 A1* 8/2013 Jeon .................. H04W 72/0406
370/329
2013/0310098 A1 11/2013 Baligh et al.
(Continued)

FOREIGN PATENT DOCUMENTS

EP 3190820 7/2017
KR 1020140066652 6/2014
(Continued)

OTHER PUBLICATIONS

PCT/ISA/210 Search Report issued on PCT/KR2016/000340 (pp. 3).

(Continued)

Primary Examiner — Mariela Vidal Carpio
(74) Attorney, Agent, or Firm — The Farrell Law Firm, P.C.

(57) ABSTRACT

The present disclosure is to effectively perform coordinated transmission in a wireless communication system. A base station includes a controller for providing control to generate control information including channel state information and buffer occupancy state related information of terminals, and a communication unit for transmitting the control information. In addition, the present disclosure also includes other exemplary embodiments different from the aforementioned exemplary embodiments.

12 Claims, 15 Drawing Sheets

(51) Int. Cl.
*H04W 28/02* (2009.01)
*H04W 72/12* (2009.01)

(56) References Cited

U.S. PATENT DOCUMENTS

| | | | | |
|---|---|---|---|---|
| 2014/0073368 A1* | 3/2014 | Teyeb | ................... | H04B 15/02 455/501 |
| 2014/0148181 A1 | 5/2014 | Lee et al. | | |
| 2014/0192734 A1 | 7/2014 | Ng et al. | | |
| 2014/0211652 A1* | 7/2014 | Shi | ................ | H04W 24/08 370/252 |
| 2014/0233407 A1* | 8/2014 | Pourahmadi | .......... | H04L 5/0094 370/252 |
| 2014/0233419 A1 | 8/2014 | Cheng et al. | | |
| 2014/0293914 A1* | 10/2014 | Maattanen | ............ | H04L 5/0035 370/329 |
| 2015/0092684 A1* | 4/2015 | Cheng | ............... | H04W 72/1263 370/329 |
| 2015/0318966 A1* | 11/2015 | Liu | ....................... | H04W 28/16 370/329 |
| 2015/0349908 A1* | 12/2015 | Centonza | .............. | H04W 52/36 370/329 |
| 2015/0365967 A1* | 12/2015 | Ni | ........................ | H04B 7/0626 370/329 |
| 2016/0036571 A1* | 2/2016 | Park | .................... | H04B 17/382 370/330 |
| 2016/0094321 A1* | 3/2016 | Prasad | .................. | H04L 5/0035 370/329 |
| 2016/0255622 A1* | 9/2016 | Xiong | .............. | H04W 72/0426 370/329 |
| 2017/0111280 A1* | 4/2017 | Zhang | ............... | H04W 28/0289 |
| 2017/0155482 A1* | 6/2017 | Xiong | .................... | H04B 7/022 |
| 2017/0244434 A1* | 8/2017 | Sesia | .................... | H04B 1/1027 |

FOREIGN PATENT DOCUMENTS

| | | |
|---|---|---|
| KR | 1020140114759 | 9/2014 |
| KR | 1020160028167 | 3/2016 |

OTHER PUBLICATIONS

PCT/ISA/237 Written Opinion issued on PCT/KR2016/000340 (pp. 5).
3GPP TSG RAN3 Meeting #86, R3-142802, San Francisco, USA, Nov. 17-21, 2014, CSI Exchange for Inter-eNB CoMP, pp. 10.
3GPP TSG-RAN WG3 #86, R3-142784, Nov. 17-21, 2014, San Francisco, USA, Discussions on CSI Signalling for inter-eNB CoMP, pp. 4.
3GPP TSG-RAN WG3 Meeting #86, R3-142652, San Francisco, CA USA, Nov. 17-21, 2014, Introduction of enhanced inter-eNB CoMP, pp. 3.
3GPP TS 36.423 V12.4.0 (Dec. 2014), 3rd Generation Partnership Project; Technical Specification Group Radio Access Network; Evolved Universal Terrestrial Radio Access Network.
LG Electronics, "Inter-eNB Comp Signaling with non-ideal backhaul", R1-141836, 3GPP TSG RAN WG1 Meeting #76bis, Mar. 31-Apr. 4, 2014, 6 pages.
Alcatel-Lucent et al., "Proposed Signalling Information Supporting eCoMP with NIB", R1-140168, 3GPP TSG RAN WG1 Meeting #76, Feb. 10-14, 2014, 6 pages.
European Search Report dated Jan. 15, 2018 issued in counterpart application No. 16740348.4-1215, 9 pages.
European Search Report dated Feb. 7, 2019 issued in counterpart application No. 16740348.4-1215, 7 pages.
European Search Report dated Aug. 26, 2020 issued in counterpart application No. 20161873.3-1215, 6 pages.
Korean Office Action dated Feb. 16, 2021 issued in counterpart application No. 10-2015-0008948, 8 pages.
Korean Office Action dated Aug. 20, 2021 issued in counterpart application No. 10-2015-0008948, 9 pages.
KR Notice of Patent Grant dated Nov. 10, 2021 issued in counterpart application No. 10-2015-0008948, 4 pages.

* cited by examiner

| t | t+1 | t+2 | t+3 | t+4 |
|---|---|---|---|---|
| Terminal #k | | Terminal #k | Terminal #k+4 | Terminal #k+1 |
| Terminal #k+1 | | | | Terminal #k+4 |
| Terminal #k+2 | | | | |

| CSI of terminal#k | CSI of terminal#k+1 | ... |
|---|---|---|

APPARATUS AND METHOD FOR TRANSMITTING CONTROL INFORMATION FOR COORDINATED TRANSMISSION IN WIRELESS COMMUNICATION SYSTEM

PRIORITY

This application is a National Phase Entry of PCT International Application No. PCT/KR2016/000340, which was filed on Jan. 13, 2016, and claims priority to Korean Patent Application No. 10-2015-0008948, which was filed on Jan. 19, 2015, the contents of each of which are incorporated herein by reference.

TECHNICAL FIELD

The present disclosure relates to a wireless communication system, and more specifically, to apparatus and method for transmitting control information for coordinated transmission in wireless communication system.

BACKGROUND ART

A wireless communication system provides a wireless access service to a user device, and includes transmission points called a base station in order to support mobility. The base station may provide a radio access to terminals located in a geographical region of a specific range called a cell.

In order to provide a spatially seamless service, the cells may be installed without an interval or in a partially overlapping manner Accordingly, a signal transmitted in each cell may act as severe interference to a terminal which performs communication in a neighboring cell. Therefore, various techniques for mitigating interference are under research.

An example of the technique for mitigating inter-cell interference includes coordinated transmission. The coordinated transmission is a control scheme in which a plurality of base stations coordinate mutual signal transmission to decrease the inter-cell interference. However, when it is intended to perform the coordinated transmission, information regarding a resource usage of the base stations must be exchanged rapidly without a delay. That is, an ideal backhaul connection is required between the base stations.

The ideal backhaul can be secured when hardware entities of the base stations are physically adjacent to each other, or when a signal path between the base stations is implemented with a medium which supports high-speed communication. However, since an environment having the ideal backhaul cannot be expected for all wireless communication networks, there is a limitation in that the coordinated transmission cannot be guaranteed.

DISCLOSURE OF INVENTION

Technical Problem

An exemplary embodiment of the present disclosure provides an apparatus and method for performing cooperative communication in a wireless communication system.

Another exemplary embodiment of the present disclosure provides an apparatus and method for performing coordinated transmission in an environment having a backhaul delay in a wireless communication system.

Another exemplary embodiment of the present disclosure provides an apparatus and method for transmitting control information for coordinated transmission in a wireless communication system.

Another exemplary embodiment of the present disclosure provides an apparatus and method for transmitting information regarding a buffer occupancy state in a wireless communication system.

Another exemplary embodiment of the present disclosure provides an apparatus and method for transmitting channel information of terminals in a wireless communication system.

Solution to Problem

According to various embodiments of the present disclosure, a method for operating a base station in a wireless communication system comprises transmitting control information comprising channel state information and buffer occupancy state related information of terminals, and receiving transmission pattern information determined based on the buffer occupancy state related information. Herein, the buffer occupancy state related information indicates a presence or absence of downlink transmission data for each of a plurality of transmission durations.

According to various embodiments of the present disclosure, a method for operating an apparatus for controlling a resource usage of a plurality of base stations comprises receiving, from base stations, control information comprising channel state information and buffer occupancy state related information of terminals, and transmitting transmission pattern information determined based on the buffer occupancy state related information. Herein the buffer occupancy state related information indicates a presence or absence of downlink transmission data for each of a plurality of transmission durations.

According to various embodiments of the present disclosure, a base station in a wireless communication system comprises at least one transceiver configured to transmit control information comprising channel state information and buffer occupancy state related information of terminals, and receive transmission pattern information determined based on the buffer occupancy state related information. Herein the buffer occupancy state related information indicates a presence or absence of downlink transmission data for each of a plurality of transmission durations.

According to various embodiments of the present disclosure, an apparatus for controlling a resource usage of a plurality of base stations comprises at least one transceiver configured to receive, from base stations, control information comprising channel state information and buffer occupancy state related information of terminals, and transmit transmission pattern information determined based on the buffer occupancy state related information. Herein the buffer occupancy state related information indicates a presence or absence of downlink transmission data for each of a plurality of transmission durations.

Advantageous Effects of Invention

In a wireless communication system, interference control and cooperative communication can be performed even in a network having a transmission delay, and thus an effective resource restriction can be achieved between base stations.

BEST MODE FOR CARRYING OUT THE INVENTION

Figure 1:
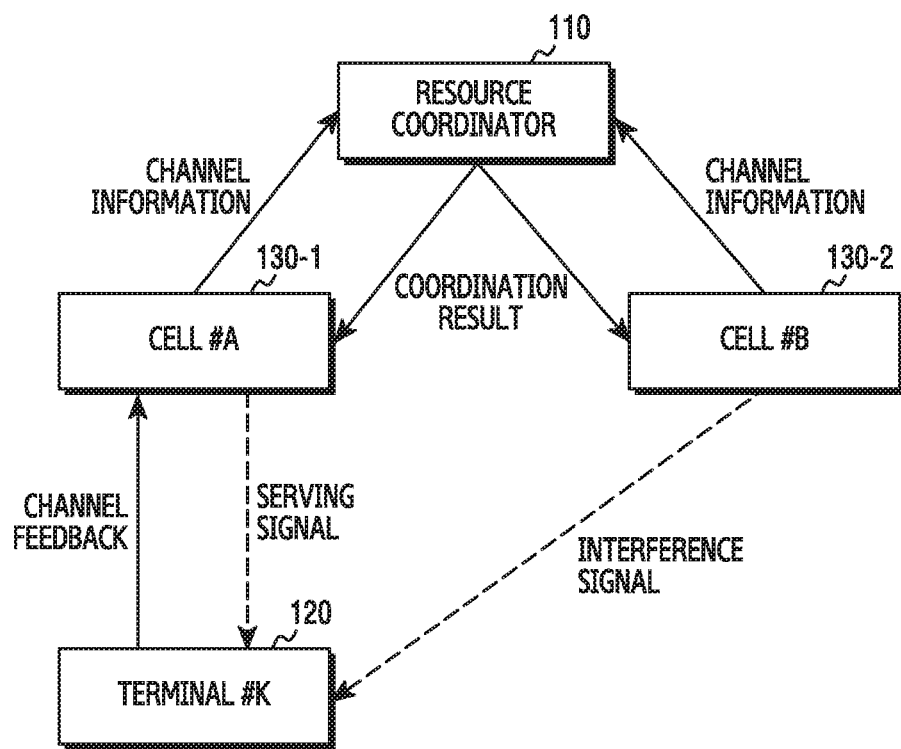
FIG. 1 illustrates an example of a system configuration for centric scheduling in a wireless communication system according to an exemplary embodiment of the present disclosure.

The present disclosure will be described herein below with reference to the accompanying drawings. In the following description, well-known functions or constructions are not described in detail since they would obscure the invention in unnecessary detail. Also, the terms used herein are defined according to the functions of the present disclosure. Thus, the terms may vary depending on user's or operator's intension and usage. That is, the terms used herein must be understood based on the descriptions made herein.

Hereinafter, the present disclosure describes a technique for generating and transmitting control information for coordinated transmission in a wireless communication system. In particular, the present disclosure describes a technique for generating control information provided from a base station to a scheduling device to perform the coordinated transmission in the wireless communication system.

In the following description, terms referring to a transmission scheme, a network entity, information items, a connection state, or the like are exemplified for convenience of explanation. Therefore, the present disclosure is not limited to the terminologies described below, and other terminologies having identical technical meanings may also be used.

Hereinafter, the term ' . . . unit', ' . . . device', or the like implies a unit of processing at least one function or operation, and may be implemented in hardware or software or in combination of the hardware and the software.

For convenience of explanation, some terms and names defined in the $3^{rd}$ Generation Partnership Project (3GPP) Long Term Evolution (LTE) standard may be used in the present disclosure. However, the present disclosure is not limited to the above terms and names, and thus may also be equally applied to a system conforming to another standard.

In a wireless communication system, coordinated transmission between multi-cells may be adopted to solve inter-cell interference which may easily occur in an environment where a plurality of cells are densely located. The coordinated transmission is a control scheme in which a plurality of base stations coordinate mutual signal transmission to decrease the inter-cell interference. The coordinated transmission may be referred to as a 'Coordinated Multi-Point (CoMP)'. For the coordinated transmission, there is a need for a function of coordinating scheduling for resources among the plurality of base stations. In other words, for the coordinated transmission, which base station will transmit a signal among neighboring base stations and whether to transmit or not to transmit the signal are required in a specific transmission duration (e.g., a frame, a subframe, a Physical Resource Block (PRB), a physical channel, etc.) and a specific subcarrier.

Accordingly, for the coordinated transmission, a functional entity for coordinating a resource usage of the plurality of base stations may be included in a system. Hereinafter, the functional entity is referred to as a 'resource coordinator'. The resource coordinator may be one physical constitutional element, or may be implemented in each base station in a distributed manner A case where the resource coordinator is implemented as one constitutional element is exemplified below in FIG. 1, and a case where the resource coordinator is implemented in a distributed manner is exemplified below in FIG. 2.

FIG. 1 illustrates an example of a system configuration for centric scheduling in a wireless communication system according to an exemplary embodiment of the present disclosure. A case where the resource coordinator is functionally separated from base stations is exemplified in FIG. 1.

Referring to FIG. 1, in a state of being attached to a cell#A 130-1, a terminal#k 120 receives a serving signal from the cell#A 130-1, and receives an interference signal from a neighboring cell#B 130-2. The terminal #k 120 transmits a channel feedback to the cell#A 130-1. The channel feedback is generated by the terminal#k 120 attached to the cell#A 130-1, and may include channel information considering the cell#B 130-2. In other words, the channel feedback may be generated based on measurement on the serving signal or the interference signal. A specific configuration of the channel information may be determined by the cell#A 130-1.

The cell#A 130-1 transmits the channel information to a resource coordinator 110. The channel information includes the channel feedback received from the terminal#k 120 or information processed based on the channel feedback. In addition, the cell#B 130-2 transmits to the resource coordinator 110 the channel information received from a terminal attached to the cell#B 130-2. Accordingly, the resource coordinator 110 transmits a coordinator result to the cell#A 130-1 and the cell#B 130-2. In other words, the resource coordinator 110 transmits a transmission pattern for the cell#A 130-1 and the cell#B 130-2.

That is, in case of the centric scheme of FIG. 1, the resource coordinator 110 may restrict a resource usage for each base station in a specific time and frequency resource by considering whether there is inter-cell interference and whether resources are used based on information (e.g., base station resource information) delivered form the cell#A 130-1 and the cell#B 130-2. In addition, the resource coordinator shares whether the resource usage is restricted. Accordingly, the cell#A 130-1 and the cell#B 130-2 perform resource allocation for a terminal based on whether the shared resource usage is restricted. That is, the cell#A 130-1 and the cell#B 130-2 allocate a resource to a terminal having a high gain depending on a presence/absence of interference based on the resource usage restriction, thereby improving performance.

Figure 2:
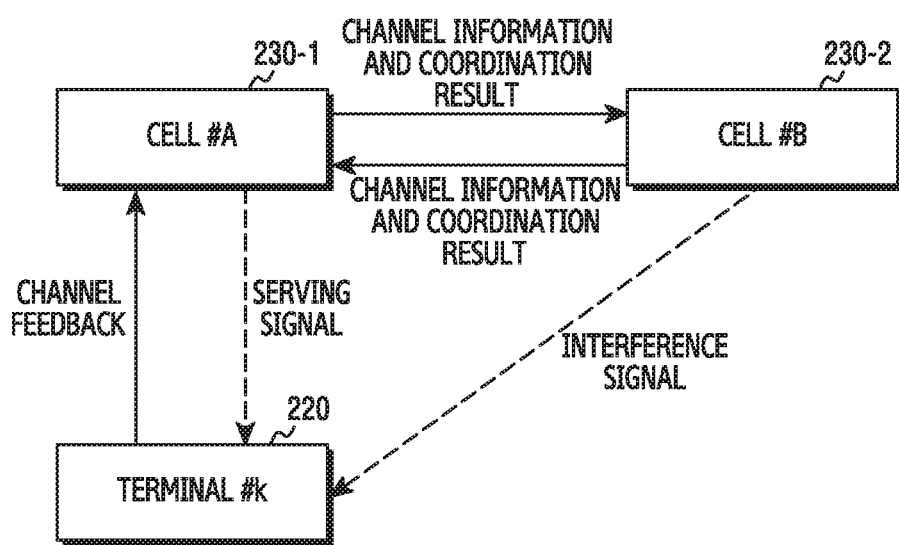
FIG. 2 illustrates an example of a system configuration for distributed scheduling in a wireless communication system according to an exemplary embodiment of the present disclosure.

FIG. 2 illustrates an example of a system configuration for distributed scheduling in a wireless communication system according to an exemplary embodiment of the present disclosure. A case where the resource coordinator is functionally distributed is exemplified in FIG. 2.

Referring to FIG. 2, in a state of being attached to a cell#A 230-1, a terminal#k 220 receives a serving signal from the cell#A 230-1, and receives an interference signal from a neighboring cell#B 230-2. The terminal #k 220 transmits a channel feedback to the cell#A 230-1. The channel feedback is generated by the terminal#k 220 attached to the cell#A 230-1, and may include channel information considering the cell#B 230-2. In other words, the channel feedback may be generated based on measurement on the serving signal or the interference signal. A specific configuration of the channel information may be determined by the cell#A 230-1.

Unlike in the example of FIG. 1, since the resource coordinator 110 is not implemented separately, the cell#A 230-1 determines a coordination result, that is, a transmission pattern of the cell#A 230-1, and transmits channel information and the coordination result to the cell#B 230-2 which is a neighboring cell. Similarly, the cell#B 230-2 determines a coordination result, that is, a transmission pattern of the cell#B 230-2, and transmits channel information and the coordination result to the cell#A 230-1 which is a neighboring cell. That is, the cell#A 230-1 and the cell#B 230-2 partially perform a function of the resource coordinator 110. In other words, the cell#A 230-1 and the cell#B 230-2 perform functions of the resource coordinator 110 for themselves, and mutually exchange the determined transmission pattern.

That is, in case of the distributed scheme of FIG. 2, each of the cell#A 230-1 and the cell#B 230-2 shares resource information with another cell, and whether to share its resource usage restriction is determined based on information collected from each cell. In addition, the cell#A 230-1 and the cell#B 230-2 share whether the resource usage is restricted. Accordingly, the cell#A 230-1 and the cell#B 230-2 perform resource allocation for a terminal based on whether the shared resource usage is restricted. That is, the cell#A 230-1 and the cell#B 230-2 allocate a resource to a terminal having a high gain depending on a presence/absence of interference based on the resource usage restriction, thereby improving performance.

The resource coordinator may be functionally independent of base stations as shown in the example of FIG. 1, or may be implemented in a distributed manner in each base station as shown in FIG. 2. Further, if the resource coordinator 110 is functionally independent, the resource coordinator 110 may be implemented as an independent network entity, as a part of a base station, or as a dummy base station. Hereinafter, these cases are exemplified respectively in FIG. 3, FIG. 4, and FIG. 5.

Figure 3:
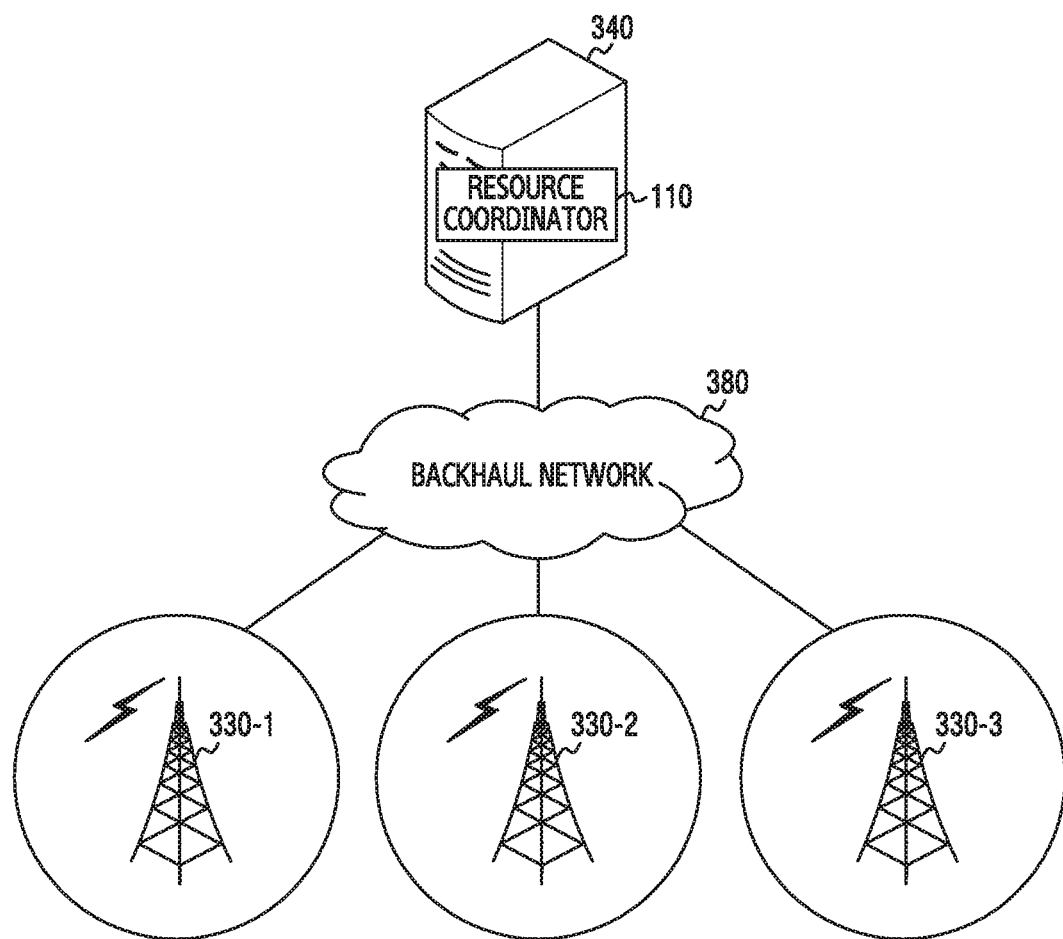
FIG. 3 illustrates an example of a method of implementing a resource coordinator in a wireless communication system according to an exemplary embodiment of the present disclosure.

FIG. 3 illustrates an example of a method of implementing the resource coordinator 110 in a wireless communication system according to an exemplary embodiment of the present disclosure. Referring to FIG. 3, the resource coordinator 110 consists of a separate network entity 340. Herein, the network entity 340 may be referred to as a 'resource coordination server', a 'coordinated transmission server', or the like. The network entity 340 receives basis information from a plurality of base stations 330-1 to 330-3 through a backhaul network 380, determines a transmission pattern of the base stations 330-1 to 330-3, and transmits the transmission pattern.

Figure 4:
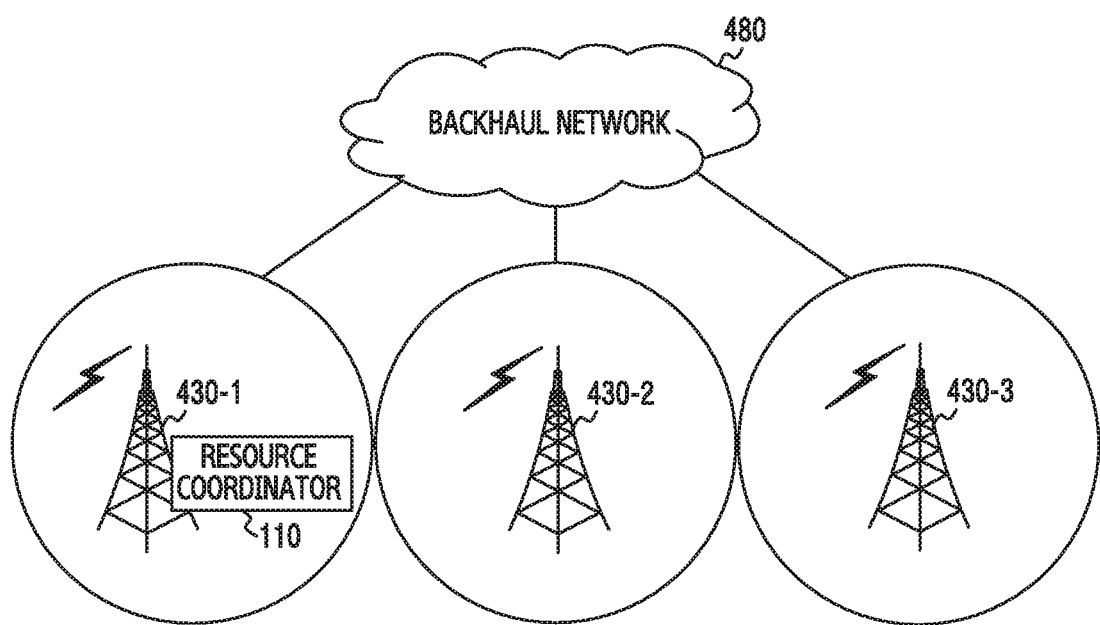
FIG. 4 illustrates another example of a method of implementing a resource coordinator in a wireless communication system according to an exemplary embodiment of the present disclosure.

FIG. 4 illustrates another example of a method of implementing the resource coordinator 110 in a wireless communication system according to an exemplary embodiment of the present disclosure. Referring to FIG. 4, the resource coordinator 101 is included as a part of a base station#A 430-1 which is one of a plurality of base stations 430-1 to 430-3. Accordingly, the base station#A 430-1 receives basis information from the other base stations 430-2 and 430-3 through a backhaul network 480, determines a transmission pattern of the base stations 430-1 to 430-3 in addition to its own pattern, and transmits the transmission pattern.

Figure 5:
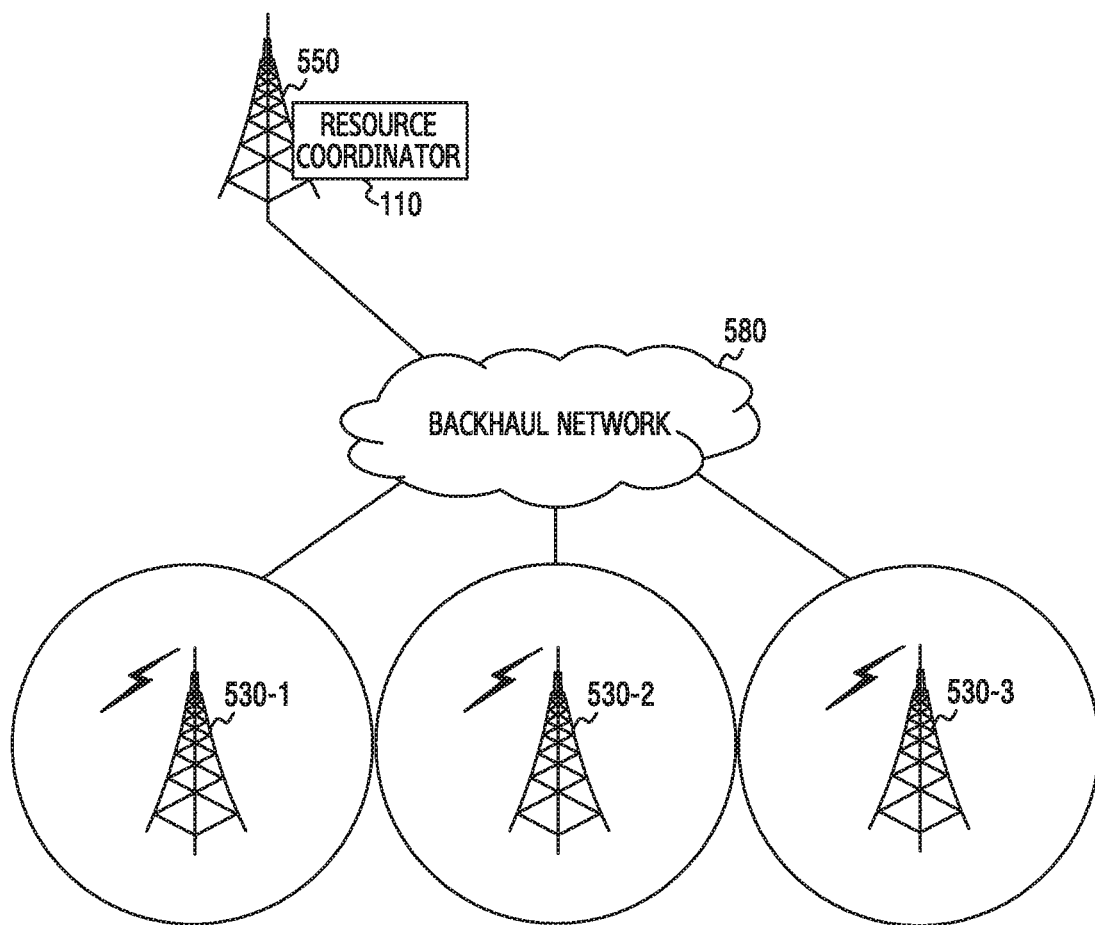
FIG. 5 illustrates another example of a method of implementing a resource coordinator in a wireless communication system according to an exemplary embodiment of the present disclosure.

FIG. 5 illustrates another example of a method of implementing the resource coordinator 110 in a wireless communication system according to an exemplary embodiment of the present disclosure. Referring to FIG. 5, the resource coordinator 110 may be implemented as a part of a dummy base station 550. Unlike in other base stations 530-1 to 530-3, the dummy base station 550 does not perform wireless communication with respect to a terminal, and does not have a cell. The dummy base station 550 receives basis information from the base stations 530-1 to 530-3 through a backhaul network 580, determines a transmission pattern of the base stations 530-1 to 530-3, and transmits the transmission pattern.

Various exemplary embodiments of the present disclosure are described by taking an example of a system in which a base station and a terminal connected to the base station for cooperative communication and the aforementioned resource coordinator supporting cooperative communication between the base stations are configured functionally independently. Since the resource coordinator is introduced, the cooperative communication can be supported also in a system which uses an interface between the resource coordinator and base stations or an interface of which transmission capacity is restricted due to a transmission delay between base stations participating in the cooperative communication.

As described above, the base stations transmit basis information to the resource coordinator. The basis information includes control information required to determine transmission restrictions, i.e., a transmission pattern, of the base stations. According to one exemplary embodiment of the present disclosure, the control information includes information regarding a buffering state of downlink data of the base station and information regarding a channel state of terminals attached to the base station. Hereinafter, for convenience of explanation, the information regarding the buffering state of the downlink data is referred to as 'buffer occupancy state information', and the information regarding the channel state is referred to as 'Channel State Information (CSI)'.

The buffer occupancy state information may include information regarding a downlink buffer of the base station. That is, the buffer occupancy state information may indicate whether there is data buffered to be transmitted in a corresponding scheduling unit, i.e., each transmission duration or all time durations. Further, the buffer occupancy state information may further include identification information regarding a destination terminal of the buffered data. Whether to transmit the downlink data may be expressed for a specific subcarrier and a group of a specific number of subcarriers.

The CSI may include at least one of Reference Signal Received Power (RSRP), uplink Sounding Reference Signal (SRS) power, a Channel-Quality Indicator (CQI), a Precoding Matrix Indicator (PMI), and a Rank Indicator (RI). For this, the base stations may receive channel information measured based on a Cell-Specific Reference Signal (CRS) or a Channel-State Information-Reference Signal (CSI-RS) from the terminal, and may transmit the CSI generated from the received channel information to the resource coordinator 110. The CSI may be defined based on a noise level and an interference signal against a serving signal. In this case, a neighboring base stations included in an interference source of the interference signal may be selectively determined. When a multi-CSI feedback scheme is used, a plurality of pieces of CSI may be provided.

The CSI may be generated from information fed back from the terminal That is, the terminal feeds back information (e.g., RSRP and Reference Signal Received Quality (RSRQ) of a measurement report) regarding signals received from a serving base station and a neighboring base station and channel quality information (e.g., CSI or CQI) to the serving base station. Further, under the control of the base station, the terminal may measure and feed back a plurality of pieces of channel quality information having different configurations.

The CSI is based on a signal quality ratio (e.g., a Signal to Interference Noise Ratio (SINR)) of the serving base station against a neighboring signal and interference. Herein, the channel quality information may be measured by various configuration combinations for a signal source and an interference source. Herein, the base station may configure the signal source and the interference source in various manners. The signal source is determined by the configuration of a signal measurement resource, and the interference source is determined by the configuration of an interference measurement resource. In other words, the signal source may be measured by the CSI-RS, and the interference source may be measured by a CSI-Interference Measurement (IM). The base station may notify a combination of the signal measurement resource and the interference measurement resource to the terminal. In addition, the terminal may indicate a combination corresponding to CSI reported through an index corresponding the combination to be reported.

The terminal may detect a signal component from a combination of up to 3 neighboring base stations by using a non-zero power CSI-RS of the CSI-RS configuration. In addition, the terminal may detect an interference component from the combination of up to 3 neighboring base stations by using a zero power CSI-RS of the CSI-IM configuration. For this, base stations participating in coordinated transmission transmit signals to enable signal and interference estimation required for an operation of intended coordinated transmission through a radio resource designated by using the CSI-RS configuration and the CSI-IM configuration.

The terminal may measure channel quality (e.g., SINR) through a plurality of CSI processes combining measurement results using the CSI-RS and the CSI-IM. That is, the channel information of the terminal may be a set of CSI information for a CQI or CSI or multi-CSI process. If the CSI based on the multi-CSI process is fed back, an index for the configuration of each CSI may be fed back together. The index for the configuration may be defined for each base station, and may be defined based on a configuration of a signal measurement resource and interference measurement resource for a neighboring base station. As such, the terminal may measure channel quality based on a presence/absence of interference of the neighboring base station, and may feed back the CSI to the serving base station. Therefore, the base station may collect channel quality information required for intended coordinated transmission through a proper combination of the CSI-RS configuration and the CSI-IM configuration.

Figure 6:
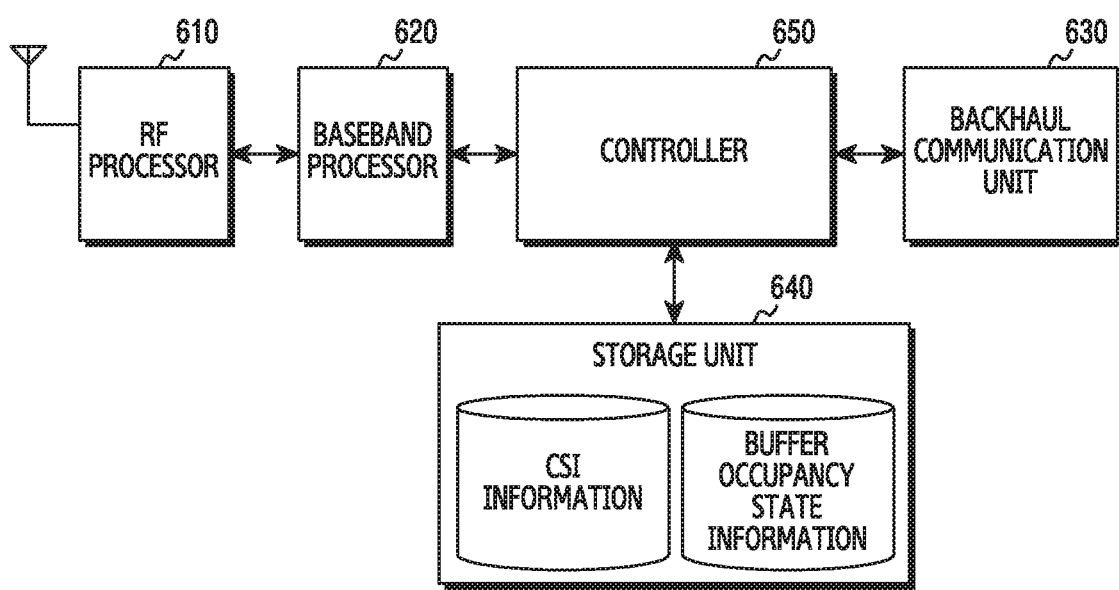
FIG. 6 is a block diagram of a base station in a wireless communication system according to an exemplary embodiment of the present disclosure.

FIG. 6 is a block diagram of a base station in a wireless communication system according to an exemplary embodiment of the present disclosure.

As shown in FIG. 6, the base station includes a Radio Frequency (RF) processor 610, a baseband processor 620, a backhaul communication unit 630, a storage unit 640, and a controller 650.

The RF processor 610 performs a function for transmitting and receiving a signal through a wireless channel by performing signal band conversion, amplification, or the like. That is, the RF processor 610 up-converts a baseband signal provided from the baseband processor 620 into an RF signal, and then transmits the RF signal through an antenna, and also down-converts an RF signal received through the antenna into a baseband signal. For example, the RF processor 610 may include a transmission filter, a reception filter, an amplifier, a mixer, an oscillator, a Digital to Analog Converter (DAC), an Analog to Digital Converter (ADC), or the like. Although only one antenna is shown in FIG. 6, the base station may have a plurality of antennas. In addition, the RF processor 610 may include a plurality of RF chains. Further, the RF processor 610 may perform beamforming For the beamforming, the RF processor 610 may adjust a phase and magnitude of each of signals transmitted and received through a plurality of antennas or antenna elements.

The baseband processor 620 performs a conversion function between a baseband signal and a bit-stream according to a physical layer protocol of the system. For example, in a data transmission process, the baseband processor 620 generates complex symbols by performing coding and modulation on a transmitted bit-stream. In addition, in a data reception process, the baseband processor 620 restores a received bit-stream by demodulating and decoding a baseband signal provided from the RF processor 610. For example, in case of conforming to an Orthogonal Frequency Division Multiplexing (OFDM) scheme, in the data transmission process, the baseband processor 620 generates complex symbols by performing coding and modulation on a transmitted bit-stream, maps the complex symbols to subcarriers, and then configures OFDM symbols by performing an Inverse Fast Fourier Transform (IFFT) operation and a Cyclic Prefix (CP) insertion operation. In addition, in the data reception process, the baseband processor 620 splits the baseband signal provided from the RF processor 610 on an OFDM symbol basis, restores signals mapped to the subcarriers by using a Fast Fourier Transform (FFT) operation, and then restores a received bit-stream by performing demodulation and decoding. The baseband processor 620 and the RF processor 610 transmit and receive signals as described above. Accordingly, the baseband processor 620 and the RF processor 610 may be referred to as a transmitter, a receiver, a transceiver, a communication unit, or a wireless communication unit.

The backhaul communication unit 630 provides an interference for performing communication with respect to other nodes in a network. That is, the backhaul communication unit 630 converts a bit-stream transmitted from the base station to a different node, e.g., a different base station, a resource coordinator, a core network, or the like, into a physical signal, and converts the physical signal received from the different node into a bit-stream.

The storage unit 640 stores data such as a basic program, application program, configuration information, or the like for an operation of the base station. In particular, the storage unit 640 stores buffer occupancy status information of the base station and CSI information of terminals. The buffer occupancy state information indicates a presence/absence of downlink transmission data during a plurality of transmission durations. That is, the buffer occupancy state information is information indicating a presence/absence of data buffered to be transmitted in a scheduling unit, i.e., each transmission duration or all time durations. Specifically, the buffer occupancy state information may indicate a presence/absence of the buffered data for each transmission duration. Alternatively, the buffer occupancy state information may include a ratio of a transmission duration in which the buffered data exists against all time durations. Further, the buffer occupancy state information may further include identification information for at least one destination terminal of the buffered data. In addition, the CSI is also based on an interference signal and noise power against a serving signal. Specifically, the CSI may include at least one of RSRP, uplink SRS power, a CQI, a PMI, and an RI. In addition, the storage unit 640 provides stored data at the request of the controller 650.

The controller 650 provides an overall control to the base station. For example, the controller 650 transmits and receives a signal via the baseband processor 620 and the RF processor 610 or the backhaul communication unit 630. In addition, the controller 650 writes data to the storage unit 640 and reads the data. For this, the controller 650 may include at least one processor. According to an exemplary embodiment of the present disclosure, the controller 650 may generate control information to be transmitted to the resource coordinator, and may transmit the control information via the backhaul communication unit 630. Since the controller 650 generates the control information, it may be referred to as a 'generator'. For example, the controller 650 may provide control the base station to perform the procedure shown in FIG. 7, FIG. 9, FIG. 11, FIG. 13, or FIG. 15. An operation of the controller 650 according to the exemplary embodiment of the present disclosure is as follows.

Figure 7:
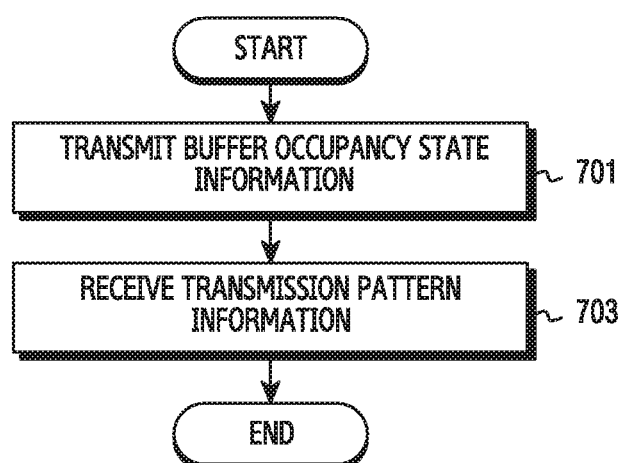
FIG. 7 illustrates a process of operating a base station in a wireless communication system according to an exemplary embodiment of the present disclosure.

According to one exemplary embodiment of the present disclosure, the controller 650 transmits control information including at least one of the buffer occupancy state information and the CSI to the resource coordinator. In addition, the controller 650 receives transmission pattern information from the resource coordinator via the backhaul communication unit 630. The transmission pattern information includes transmission restrictions for respective base stations participating in coordinated transmission. In other words, the transmission pattern information includes a scheduling result regarding whether downlink transmission is allowed for each transmission duration of the base station. Thereafter, the base station performs communication with respect to terminals based on the transmission pattern information. In this case, for a terminal which is interfered by a specific neighboring base station, the base station may allocate a resource in a transmission duration in which transmission of the neighboring base station is off FIG. 7 illustrates a process of operating a base station in a wireless communication system according to an exemplary embodiment of the present disclosure. A method of operating the base station for providing control information is exemplified in FIG. 7.

Referring to FIG. 7, in step 701, the base station transmits buffer occupancy state information to a resource coordinator. The buffer occupancy state information indicates a presence/absence of downlink transmission data during a plurality of transmission durations. That is, the buffer occupancy state information is information indicating a presence/absence of data buffered to be transmitted in a scheduling unit, i.e., each transmission duration or all time durations. Specifically, the buffer occupancy state information may indicate a presence/absence of the buffered data for each transmission duration. Alternatively, the buffer occupancy state information may include a ratio of a transmission duration in which the buffered data exists against all time durations. Further, the buffer occupancy state information may further include identification information for at least one destination terminal of the buffered data. In addition, the base station may further transmit CSI of at least one terminal in addition to the buffer occupancy state information. The CSI is also based on an interference signal and noise power against a serving signal. Specifically, the CSI may include at least one of RSRP, uplink SRS power, a CQI, a PMI, and an RI.

Thereafter, proceeding to step 703, the base station receives transmission pattern information from the resource coordinator. The transmission pattern information includes transmission restrictions for respective base stations participating in coordinated transmission. Specifically, the transmission pattern information indicates whether downlink transmission is allowed for each transmission duration. Whether to allow downlink data transmission indicated by the transmission pattern information may be expressed for a specific subcarrier and a group of a specific number of subcarriers. Accordingly, the transmission pattern information may include a plurality of transmission patterns corresponding to each subcarrier or the group of subcarriers. The transmission pattern information may be referred to as 'scheduling information'.

Although not shown in FIG. 7, the base station may perform communication with respect to terminals based on the transmission pattern information. Specifically, the base station may not allocate a resource in a transmission duration in which downlink transmission is not allowed by the transmission pattern information. In addition, the base station may allocate a resource for data transmission in the transmission duration in which downlink transmission is allowed by the transmission pattern information. In this case, for a terminal which is interfered by a specific neighboring base station, the base station may allocate a resource in a transmission duration in which transmission of the neighboring base station is off According to various exemplary embodiments of the present disclosure, the buffer occupancy state information and the CSI may be configured in various forms. The buffer occupancy state information and the CSI may be configured as shown in FIG. 8, FIG. 10, FIG. 12, or FIG. 14. Hereinafter, FIG. 8, FIG. 10, FIG. 12, and FIG. 14 exemplify a case where control information during 5 transmission durations is configured of one feedback information. That is, FIG. 8, FIG. 10, FIG. 12, and FIG. 14 exemplify a case where a transmission period of control information is 5 transmission durations. However, various exemplary embodiments of the present disclosure may also be applied to a case where the transmission period is at most 4 transmission durations or at least 6 transmission durations.

Figure 8:
FIG. 8 illustrates an example of control information in a wireless communication system according to an exemplary embodiment of the present disclosure.

FIG. 8 illustrates an example of control information in a wireless communication system according to an exemplary embodiment of the present disclosure.

Referring to FIG. 8, the control information may include identification information and CSI pairs 800 of a destination terminal of buffered data for each transmission duration (e.g., a frame, a subframe). Upon receiving channel information from terminals, a base station delivers control information having the same format as shown in FIG. 8 to a resource coordinator. The control information to be delivered from the base station to the resource coordinator may include channel information (e.g., CSI) of the terminal and a presence/absence of a resource for requiring downlink transmission for each terminal in a time resource duration. Herein, the time resource duration may have a minimum scheduling time length (e.g., 1 millisecond (ms), 1 Transmission Time Interval (TTI)).

In case of FIG. 8, within one control information transmission period (e.g., 5 transmission durations), lists of identification information and CSI pairs of a destination terminal of downlink transmission data are configured in unit of transmission duration. The CSI of the terminal may be configured as the most recent information according to whether there is a feedback from the terminal in a transmission period. In this case, the other pair other than the one pair may be configured of only the identification information of the terminal.

In case of the example of FIG. 8, it is expressed that a terminal#k, a terminal#k+1, and a terminal#k+2 have required data transmission in a transmission duration t, and CSI of the terminal#k, CSI of the terminal#k+1, and CSI of the terminal#k+2 are expressed at a corresponding time. In addition, it is expressed that no terminal has required data transmission in a transmission duration t+1. In addition, it is expressed that the terminal#k has required data transmission in a transmission duration t+2, and the CSI of the terminal# is expressed at a corresponding time. In addition, it is expressed that a terminal#k+4 has required data transmission in a transmission duration t+3, and the CSI of the terminal#k+4 is expressed at a corresponding time. In addition, it is expressed that the terminal#k+1 and the terminal#k+4 have required data transmission in a transmission duration t+4, and the CSI of the terminal#k and the CSI of the terminal#k+4 are expressed at a corresponding time.

Figure 9:
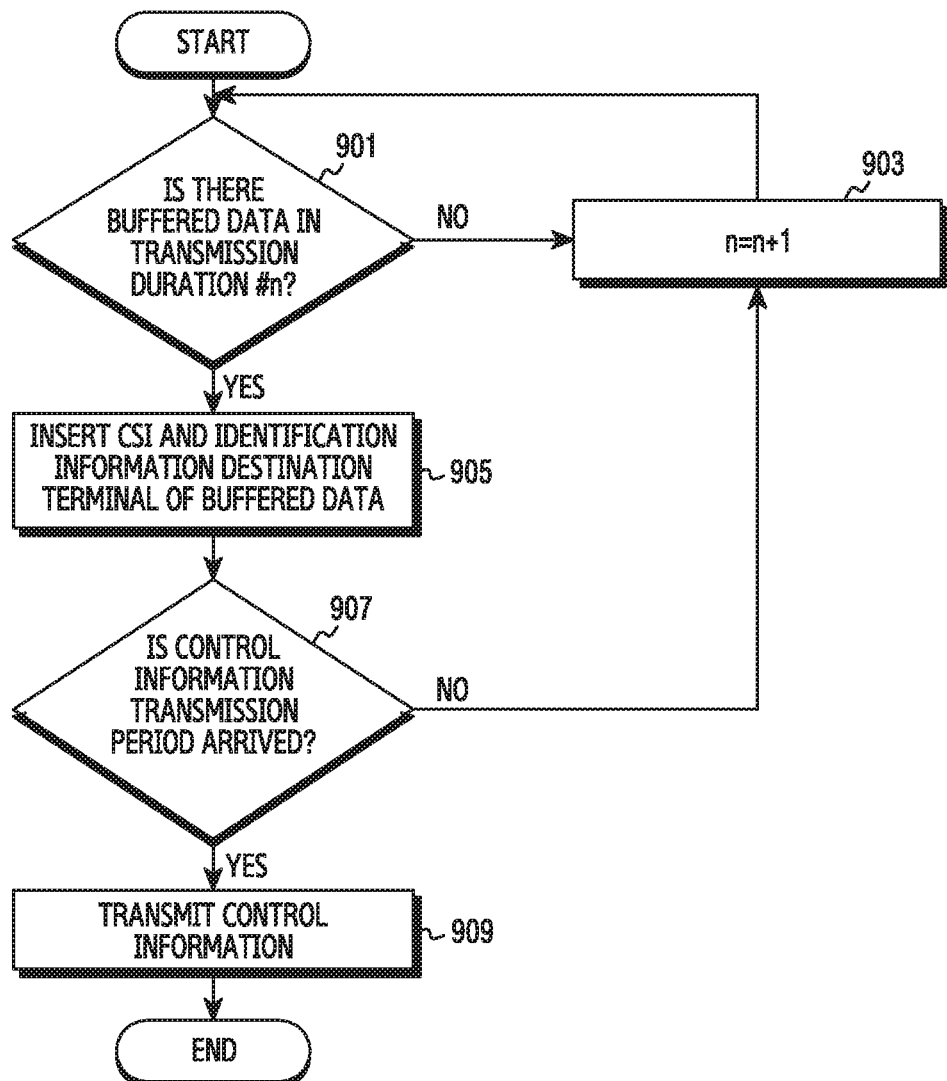
FIG. 9 illustrates a procedure of generating control information in a wireless communication system according to another exemplary embodiment of the present disclosure.

FIG. 9 illustrates a procedure of generating control information in a wireless communication system according to another exemplary embodiment of the present disclosure. A method of operating a base station for generating and transmitting control information exemplified in FIG. 8 is exemplified in FIG. 9.

Referring to FIG. 9, in step 901, the base station confirms whether there is buffered data in a transmission duration#n. The buffered data is data which requires downlink transmission, and a destination thereof is a specific terminal. If the buffered data does not exist in the transmission duration#n, proceeding to step 903, the base station increases n by 1, and repeats step 901.

Otherwise, if the buffered data exists in the transmission duration#n, proceeding to step 905, the base station inserts CSI and identification information of at least one destination terminal of the buffered data to the control information. That is, in the control information, the identification information and the CSI are paired, and are listed for each transmission duration.

Thereafter, proceeding to step 907, the base station determines whether a transmission period of control information has arrived. The control information is transmitted periodically. For example, it may be transmitted with a period of 5 transmission durations. If the transmission period has not yet arrived, proceeding to step 903, the base station increases n by 1, and repeats step 901.

Otherwise, if the transmission period has arrived, proceeding to step 909, the base station transmits the control information. That is, the base station transmits to the resource coordinator the control information including identification information and CSI pairs of at least one destination terminal of the buffered data for each transmission duration in the transmission period.

Figure 10:
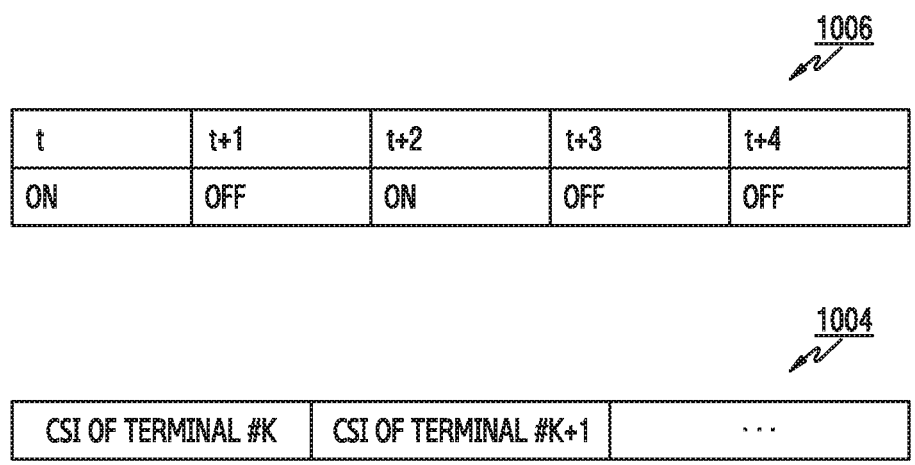
FIG. 10 illustrates an example of control information in a wireless communication system according to another exemplary embodiment of the present disclosure.

FIG. 10 illustrates an example of control information in a wireless communication system according to another exemplary embodiment of the present disclosure.

Referring to FIG. 10, the control information may include identification information 1002 of the destination terminal of the buffered data for each transmission duration and a CSI list 1004 of terminals. The control information may include the CSI list 1004 including CSI of terminals without time distinction, and separately, may also be configured of the identification information 1002 of the destination terminal of downlink transmission data in unit of transmission duration. In this case, the CSI list 1004 may include the CSI of the destination terminals of downlink transmission data generated within the transmission period of the control information, or may include CSI of terminals of which CSI is updated within the transmission period of the control information irrespective of a presence/absence of the downlink transmission data. Herein, as a representative value for a transmission period, the CSI may be a recently reported value, an average value, a value in a specific transmission duration, a maximum value, or a minimum value.

If the CSI list 1004 includes the CSI of the destination terminals of the downlink transmission data, the identification information 1002 may be replaced with indices indicating an order included in the CSI list 1004. For example, although identification information of the terminal#k is expressed in case of a transmission duration t+2 in FIG. 10, since CSI of the terminal#k is located in a first position of the CSI list 1004, the identification information of the terminal#k may be replaced with an index (e.g., 1) indicating the first position.

In case of the example of FIG. 10, the identification information 1002 is used to express that the terminal#k, the terminal#k+1, and the terminal#k+2 have required data transmission in a transmission duration t, no terminal has required data transmission in a transmission duration t+1, the terminal#k has required data transmission in a transmission duration t+2, the terminal#k+4 has required data transmission in a transmission duration t+3, and the terminal#K+1 and the terminal#k+4 have required data transmission in a transmission duration t+4. In addition, the CSI list 1004 may be used to express the CSI of the terminal#k, the CSI of the terminal#k+1, the CSI of the terminal#k+2, and the CSI of the terminal#k+4.

Figure 11:
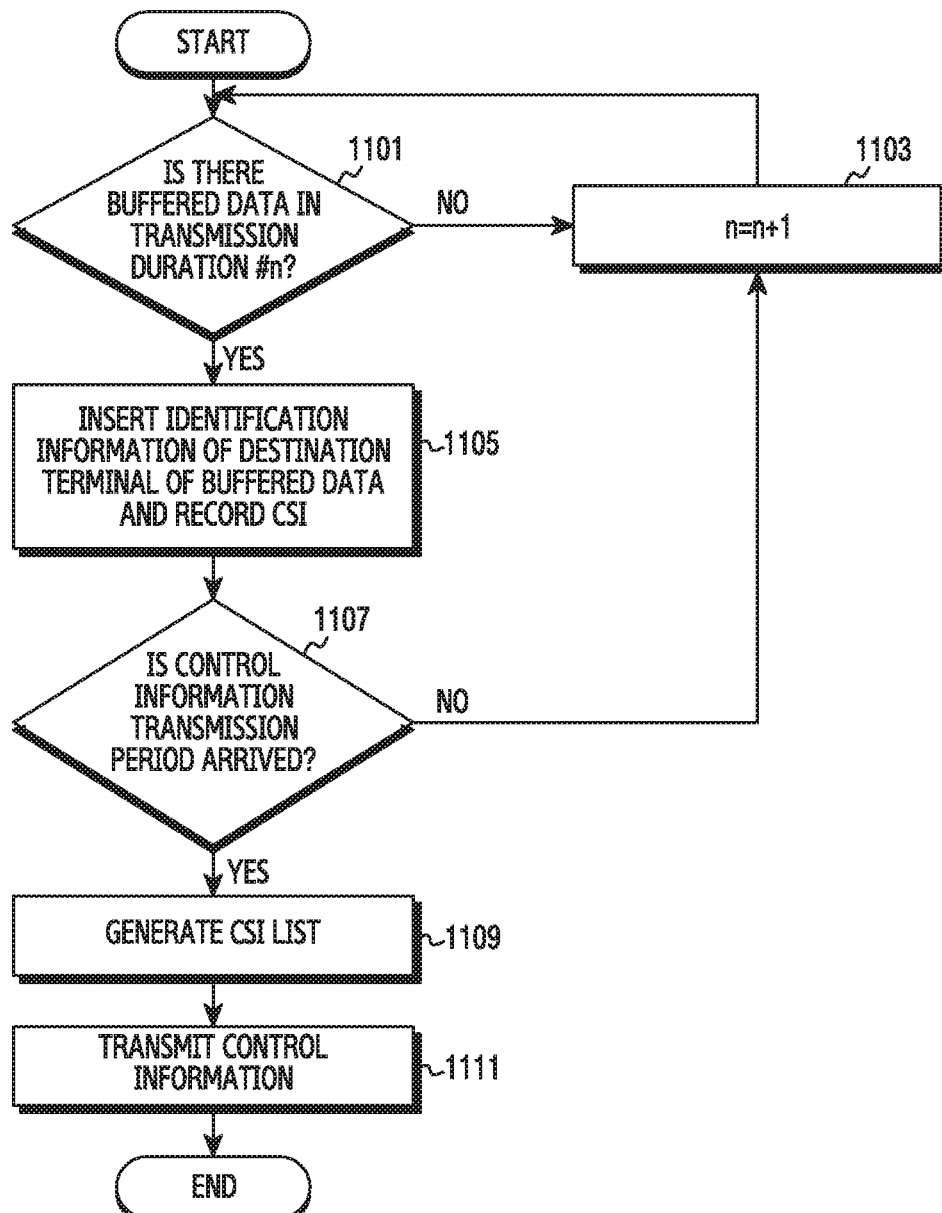
FIG. 11 illustrates a procedure of generating control information in a wireless communication system according to another exemplary embodiment of the present disclosure.

FIG. 11 illustrates a procedure of generating control information in a wireless communication system according to another exemplary embodiment of the present disclosure.

A method of operating a base station for generating and transmitting control information exemplified in FIG. 10 is exemplified in FIG. 11.

Referring to FIG. 11, in step 1101, the base station confirms whether there is buffered data in a transmission duration#n. The buffered data is data which requires downlink transmission, and a destination thereof is a specific terminal. If the buffered data does not exist in the transmission duration#n, proceeding to step 1103, the base station increases n by 1, and repeats step 1101.

Otherwise, if the buffered data exists in the transmission duration#n, proceeding to step 1105, the base station inserts identification information of at least one destination terminal of the buffered data to control information, and records CSI of the at least one destination terminal. The CSI is used to generate a CSI list at a later time. That is, the base station temporarily stores the CSI when the CSI list is generated at a later time. According to another exemplary embodiment of the present disclosure, the base station may generate the CSI list, and may insert the CSI to the CSI list. In this case, step 1109 may be omitted.

Thereafter, proceeding to step 1107, the base station determines whether a transmission period of control information has arrived. The control information is transmitted periodically. For example, it may be transmitted with a period of 5 transmission durations. If the transmission period has not yet arrived, proceeding to step 1103, the base station increases n by 1, and repeats step 1101.

Otherwise, if the transmission period has arrived, proceeding to step 1109, the base station generates the CSI list. That is, the base station generates the CSI list including the CSI recorded in step 1105, i.e., the CSI of the destination terminal of downlink transmission data confirmed in the transmission period. The CSI list includes one CSI for each terminal. According to another exemplary embodiment of the present disclosure, the base station may generate a CSI list including CSI of terminals of which the CSI is updated during the transmission period, other than the CSI of the destination terminal of downlink transmission data.

Thereafter, proceeding to step 1111, the base station transmits the control information. That is, the base station transmits to the resource coordinator the control information including identification information and CSI list of at least one destination terminal of the buffered data for each transmission duration in the transmission period.

The resource coordinator which has received the control information of FIG. 8 or FIG. 10 from each of the plurality of base stations may determine a transmission restriction of each base station or whether to use it in unit of a transmission duration based on the control information. In this case, the CSI may be used to predict interference received by a terminal of each base station from a neighboring base station and a gain in interference control. Per-terminal information and terminal list transmitted repetitively may be used to predict a resource amount to be transmitted to each terminal and a resource amount to be transmitted by the base station.

The resource coordinator determines a resource restriction result by considering an interference control gain, a resource amount, or the like of a neighboring base station of terminals. To generate the resource restriction result determined by the resource coordinator, a virtual scheduling method or the like may be used to optimize a sum of metrics (e.g., Proportional Fair (PF) metrics) of all base stations.

The resource restriction result may be configured in a bitmap form, and may be shared by each base station. In case of the centric scheme, a restriction result delivered to one base station, i.e., a transmission pattern, may include a restriction result of neighboring base stations, and may be delivered through one message depending on a period since it is divided for each application time according to a transmission period.

Figure 12:
FIG. 12 illustrates an example of control information in a wireless communication system according to another exemplary embodiment of the present disclosure.
Figure 12:

FIG. 12 illustrates an example of control information in a wireless communication system according to another exemplary embodiment of the present disclosure.

Referring to FIG. 12, the control information may include information 1206 indicating whether there is at least one terminal requiring data transmission for each transmission duration and a CSI list 1204. In other words, the control information includes a bitmap 1206 indicating whether there is a cell-based downlink transmission resource to indicate a cell-based resource amount within a transmission period together with the CSI list 1204. In this case, the delivered CSI list 1204 of the terminal includes CSI of destination terminals of downlink data information generated within a corresponding transmission period. Herein, as a representative value for a transmission period, the CSI may be a recently reported value, an average value, a value in a specific transmission duration, a maximum value, or a minimum value.

In case of the example of FIG. 12, it is expressed that there is at least one terminal requiring data transmission in a transmission duration t, there is no terminal requiring data transmission in a transmission duration t+1, there is at least one terminal requiring data transmission in a transmission duration t+2, there is no terminal requiring data transmission in a transmission duration t+3, and there is no terminal requiring data transmission in a transmission duration t+4. In addition, each CSI of terminals is expressed through the CSI list 1204.

Figure 13:
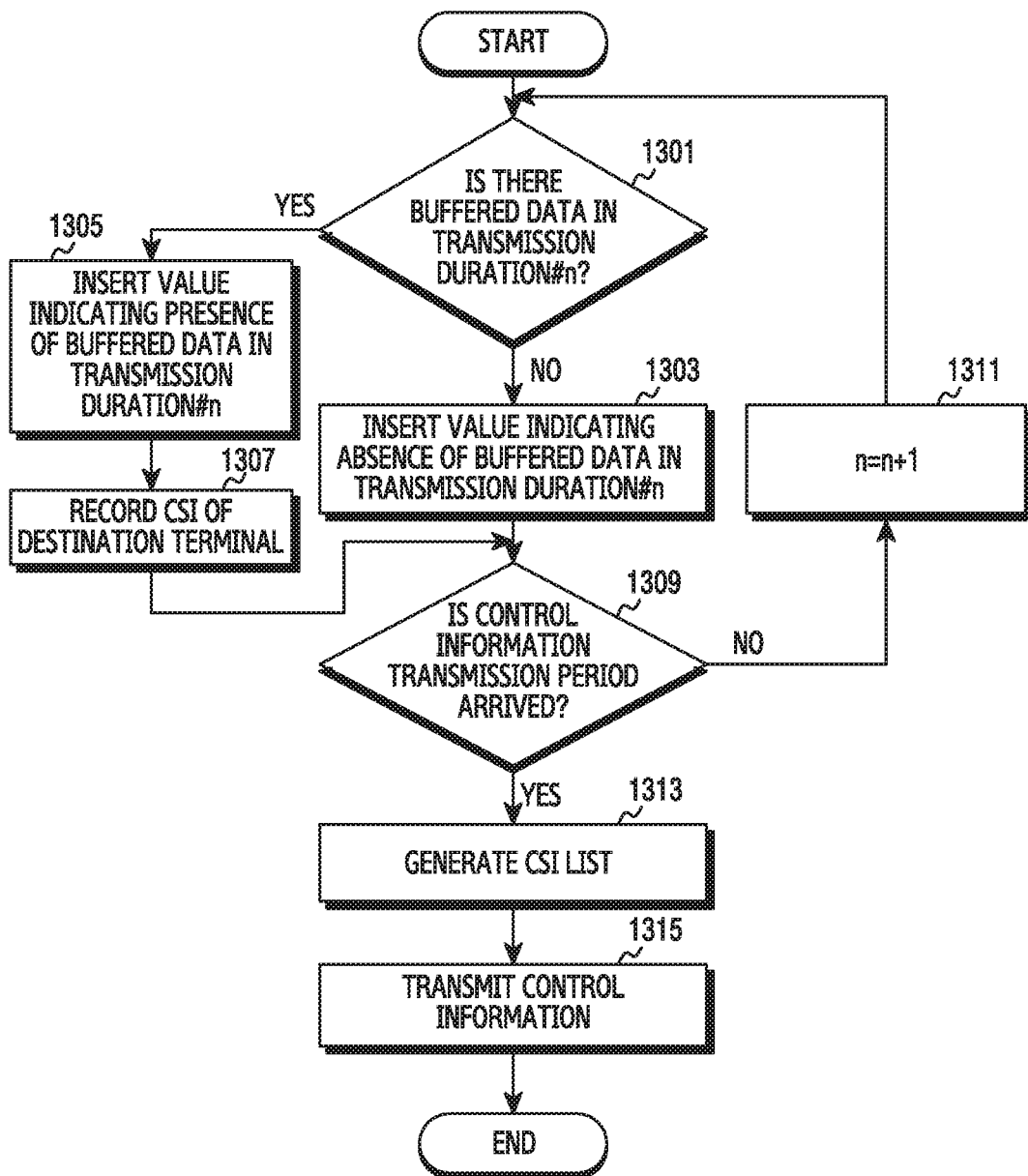
FIG. 13 illustrates a procedure of generating control information in a wireless communication system according to another exemplary embodiment of the present disclosure.

FIG. 13 illustrates a procedure of generating control information in a wireless communication system according to another exemplary embodiment of the present disclosure. A method of operating a base station for generating and transmitting control information exemplified in FIG. 12 is exemplified in FIG. 13.

Referring to FIG. 13, in step 1301, the base station confirms whether there is buffered data in a transmission duration#n. The buffered data is data which requires downlink transmission, and a destination thereof is a specific terminal If the buffered data does not exist in the transmission duration#n, proceeding to step 1303, the base station inserts to a bitmap a value indicating that the buffered data does not exist in the transmission duration#n. That is, the control information includes a bitmap indicating a presence/absence of downlink transmission data for each transmission duration.

Otherwise, if the buffered data exists in the transmission duration#n, proceeding to step 1305, the base station inserts to the bitmap a value indicating that the buffered data exists in the transmission duration#n. That is, the control information includes the bitmap indicating the presence/absence of downlink transmission data for each transmission duration.

Subsequently, proceeding to step 1307, the base station records CSI of at least one destination terminal of the buffered data. The CSI is used to generate a CSI list at a later time. That is, the base station temporarily stores the CSI when the CSI list is generated at a later time. According to another exemplary embodiment of the present disclosure, the base station may generate the CSI list, and may insert the CSI to the CSI list. In this case, step 1313 may be omitted.

Thereafter, proceeding to step 1309, the base station determines whether a transmission period of control information has arrived. The control information is transmitted periodically. For example, it may be transmitted with a period of 5 transmission durations. If the transmission period has not yet arrived, proceeding to step 1311, the base station increases n by 1, and repeats step 1301.

Otherwise, if the transmission period has arrived, proceeding to step 1313, the base station generates the CSI list. That is, the base station generates the CSI list including the CSI recorded in step 1307, i.e., the CSI of the destination terminal of downlink transmission data confirmed in the transmission period. The CSI list includes one CSI for each terminal. According to another exemplary embodiment of the present disclosure, the base station may generate a CSI list including CSI of terminals of which the CSI is updated during the transmission period, other than the CSI of the destination terminal of downlink transmission data.

Thereafter, proceeding to step 1315, the base station transmits the control information. That is, the base station transmits to the resource coordinator the control information including the CSI list and the bitmap indicating the presence/absence of data within the transmission period.

Figure 14:
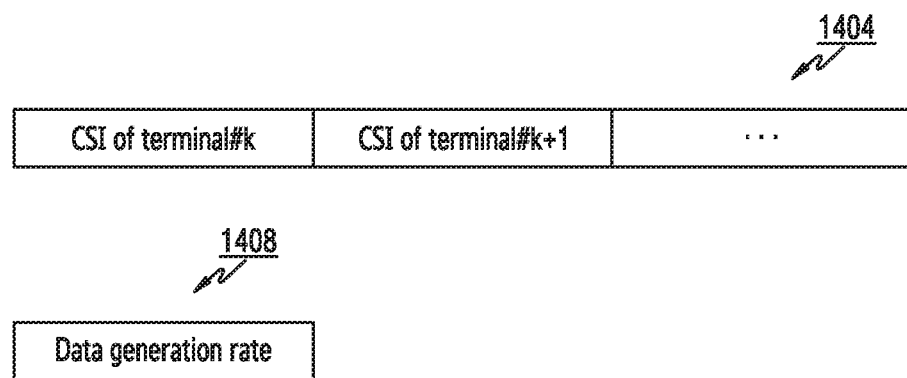
FIG. 14 illustrates an example of control information in a wireless communication system according to another exemplary embodiment of the present disclosure.

FIG. 14 illustrates an example of control information in a wireless communication system according to another exemplary embodiment of the present disclosure.

Referring to FI. 14, the control information may include a CSI list 1404 of terminals requiring data transmission during transmission durations and a data generation rate 1408 of a base station for the transmission durations. That is, a presence/absence of a transmission resource within the transmission period is expressed by being converted into a ratio. The CSI list 1404 is used to express CSI of each terminal. The data generation rate 1408 expresses a ratio of a duration in which at least one terminal requires data transmission among the transmission durations. For example, if there is no transmission resource in 3 ms out of 5 ms, the data generation rate 1408 indicates 40%. For example, in case of FIG. 14, the data generation rate 1408 is 2/5(=40%). The data generation rate 1408 may be referred to as a 'busy ratio'.

Figure 15:
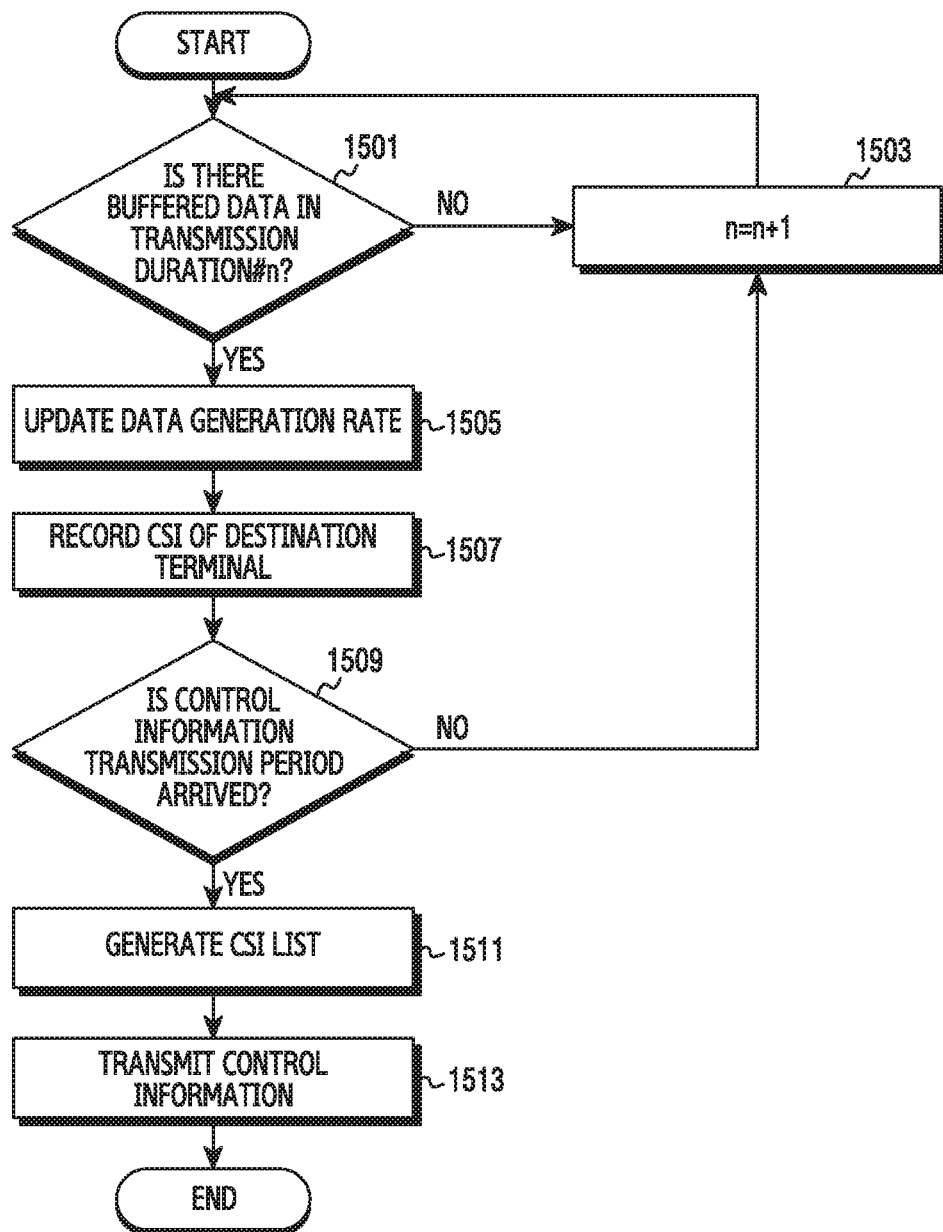
FIG. 15 illustrates a procedure of generating control information in a wireless communication system according to another exemplary embodiment of the present disclosure.

FIG. 15 illustrates a procedure of generating control information in a wireless communication system according to another exemplary embodiment of the present disclosure. A method of operating a base station for generating and transmitting control information exemplified in FIG. 14 is exemplified in FIG. 15.

Referring to FIG. 15, in step 1501, the base station confirms whether there is buffered data in a transmission duration#n. The buffered data is data which requires downlink transmission, and a destination thereof is a specific terminal. If the buffered data does not exist in the transmission duration#n, proceeding to step 1503, the base station increases n by 1, and repeats step 1501.

Otherwise, if the buffered data exists in the transmission duration#n, proceeding to step 1505, the base station updates a data generation rate. That is, since one transmission duration is confirmed in which downlink transmission data exists, the base station increases the data generation rate. The data generation rate may be referred to as a busy ratio.

Subsequently, proceeding to step 1507, the base station records CSI of the at least one destination terminal. The CSI is used to generate a CSI list at a later time. That is, the base station temporarily stores the CSI when the CSI list is generated at a later time. According to another exemplary embodiment of the present disclosure, the base station may generate the CSI list, and may insert the CSI to the CSI list. In this case, step 1511 may be omitted.

Thereafter, proceeding to step 1509, the base station determines whether a transmission period of control information has arrived. The control information is transmitted periodically. For example, it may be transmitted with a period of 5 transmission durations. If the transmission period has not yet arrived, proceeding to step 1503, the base station increases n by 1, and repeats step 1501.

Otherwise, if the transmission period has arrived, proceeding to step 1511, the base station generates the CSI list. That is, the base station generates the CSI list including the CSI recorded in step 1507, i.e., the CSI of the destination terminal of downlink transmission data confirmed in the transmission period. The CSI list includes one CSI for each terminal. According to another exemplary embodiment of the present disclosure, the base station may generate a CSI list including CSI of terminals of which the CSI is updated during the transmission period, other than the CSI of the destination terminal of downlink transmission data.

Thereafter, proceeding to step 1513, the base station transmits the control information. That is, the base station transmits to the resource coordinator the control information including the CSI list and a data transfer rate in the transmission period.

The resource coordinator which has received the control information of FIG. 12 or FIG. 14 from each of the plurality of base stations may determine a transmission restriction of each base station or whether to use it in unit of a transmission duration based on the control information. That is, the resource coordinator uses a downlink transmission resource bitmap 1206 or a data transfer rate 1408 in unit of transmission duration to predict a resource amount of each base station and to determine a resource restriction result, i.e., a transmission pattern.

For another example, the control information may include only a CSI list of terminals. In this case, if there is no downlink transmission resource for a terminal in a corresponding base station in a transmission period, the base station may transmit the CSI list, which is empty, so that the resource coordinator can predict a resource amount in unit of transmission period.

In addition to a scheduling time unit (e.g., unit of ms), the resource coordinator may determine the resource restriction result by further using signal information (e.g., RSRP) for each base station and measured separately by a terminal from a base station or measurement information for an uplink signal received by each base station from a terminal.

Methods based on the embodiments disclosed in the claims and/or specification of the present disclosure can be implemented in hardware, software, or a combination of both.

When implemented in software, computer readable recording medium for storing one or more programs (i.e., software modules) can be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the present disclosure.

The program (i.e., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, the configured memory can be plural in number.

Further, the program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device can have an access to a device for performing an exemplary embodiment of the present disclosure via an external port. In addition, an additional storage device on a communication network can have an access to the device for performing the exemplary embodiment of the present disclosure.

In the aforementioned specific exemplary embodiments, a constitutional element included in the invention is expressed in a singular or plural form according to the specific example embodiment proposed herein. However, the singular or plural expression is selected properly for a situation proposed for the convenience of explanation, and thus the various exemplary embodiments of the present disclosure are not limited to a single or a plurality of constitutional elements. Therefore, a constitutional element expressed in a plural form can also be expressed in a singular form, or vice versa.

While the present disclosure has been shown and described with reference to certain preferred embodiments thereof, it will be understood by those skilled in the art that various changes in form and details may be made therein without departing from the spirit and scope of the present disclosure as defined by the appended claims. Therefore, the scope of the present disclosure is defined not by the detailed description thereof but by the appended claims, and all differences within equivalents of the scope will be construed as being included in the present disclosure.

The invention claimed is:

1. A method performed by a first base station in a wireless communication system, the method comprising:
   determining that at least one terminal has buffered data in a transmission duration, wherein the buffered data requires downlink transmission to the at least one terminal and the at least one terminal is served by the first base station;
   inserting, in response to the determination, identification information and at least one channel state information (CSI) report to a control information, wherein the identification information is of the at least one terminal having the buffered data;
   in response to determining that a transmission period of the control information has arrived, transmitting, to a second base station, the control information; and
   receiving, from the second base station, pattern information for the first base station, the pattern information being generated based on the at least one CSI report,
   wherein the at least one CSI report includes at least one CSI process configuration index and at least one CSI of the at least one terminal,
   wherein the pattern information includes a bitmap that indicates whether a resource constraint is utilized on each of transmission resources,
   wherein each of the transmission resources corresponds to a subframe in a time domain and a physical resource block in a frequency domain, and
   wherein the pattern information is associated with a sum of metrics.

2. The method of claim 1,
   wherein the control information further includes resource information related to usage of resources of the first base station by the first base station, and
   wherein the resource information indicates a presence or absence of downlink transmission data to the at least one terminal for each of a plurality of transmission durations.

3. The method of claim 1, wherein the control information further includes at least one reference signal received power (RSRP), at least one channel quality indicator (CQI), and at least one rank indicator (RI), and
   wherein the at least one CSI report and the at least one RSRP are used to determine the pattern information.

4. The method of claim 1, wherein the pattern information indicates whether a downlink data transmission is allowed for each of the transmission resources.

5. A first base station in a wireless communication system, the first base station comprising:
   a transceiver; and
   at least one processor coupled to the transceiver and configured to:
      determine that at least one terminal has buffered data in a transmission duration, wherein the buffered data requires downlink transmission to the at least one terminal and the at least one terminal is served by the first base station,
      insert, in response to the determination, identification information and at least one channel state information (C SI) report to a control information, wherein the identification information is of the at least one terminal having the buffered data,
      in response to determining that a transmission period of the control information has arrived, transmit, to a second base station, the control information, and
      receive, from the second base station, pattern information for the first base station, the pattern information being generated based on the at least one CSI report,
   wherein the at least one CSI report includes at least one CSI process configuration index and at least one CSI of the at least one terminal,
   wherein the pattern information includes a bitmap that indicates whether a resource constraint is utilized on each of transmission resources,
   wherein each of the transmission resources corresponds to a subframe in a time domain and a physical resource block in a frequency domain, and
   wherein the pattern information is associated with a sum of metrics.

6. The first base station of claim 5,
   wherein the control information further includes resource information related to usage of resources of the first base station by the first base station, and
   wherein the resource information indicates a presence or absence of downlink transmission data to the at least one terminal for each of a plurality of transmission durations.

7. The first base station of claim 5, wherein the control information further includes at least one reference signal received power (RSRP), at least one channel quality indicator (CQI), and at least one rank indicator (RI), and
   wherein the at least one CSI report and the at least one RSRP are used to determine the pattern information.

8. The first base station of claim 5, wherein the pattern information indicates whether a downlink data transmission is allowed for each of the transmission resources.

9. A second base station for controlling a resource usage of a plurality of base stations, the second base station comprising:
- a transceiver; and
- at least one processor coupled to the transceiver and configured to:
- determine that at least one terminal has buffered data in a transmission duration, wherein the buffered data requires downlink transmission to the at least one terminal and the at least one terminal is served by the second base station;
- obtain at least one channel state information (CSI) of the at least one terminal;
- receive, from a first base station, control information including both at least one (CSI) report of at least one terminal served by the first base station and identification information of the at least one terminal served by the first base station having second buffered data, and
- transmit, to the first base station, pattern information for the first base station, the pattern information being generated based on the at least one CSI report,
- wherein the at least one CSI report includes at least one index for at least one CSI process configuration index and at least one CSI of the at least one terminal served by the first base station,
- wherein the pattern information includes a bitmap that indicates whether a resource constraint is utilized on each of transmission resources,
- wherein each of the transmission resources corresponds to a subframe in a time domain and a physical resource block in a frequency domain, and
- wherein the pattern information is associated with a sum of metrics.

10. The second base station of claim 9,
- wherein the control information further includes resource information related to usage of resources of the first base station by the first base station, and
- wherein the resource information indicates a presence or absence of downlink transmission data to the at least one terminal, served by the first base station, for each of a plurality of transmission durations.

11. The second base station of claim 9, wherein the control information further includes at least one reference signal received power (RSRP), at least one channel quality indicator (CQI), and at least one rank indicator (RI), and
- wherein the at least one CSI report and the at least one RSRP are used to determine the pattern information.

12. The second base of claim 9, wherein the pattern information indicates whether a downlink data transmission is allowed for each of the transmission resources.

* * * * *